June 25, 1940.  C. O. FAIRCHILD  2,205,777
PHOTOELECTRIC INDICATING CONTROLLER
Filed Feb. 10, 1937.   7 Sheets-Sheet 1

Fig. 1.

INVENTOR.
C. O. FAIRCHILD
BY
ATTORNEYS.

June 25, 1940.    C. O. FAIRCHILD    2,205,777
PHOTOELECTRIC INDICATING CONTROLLER
Filed Feb. 10, 1937    7 Sheets-Sheet 2

INVENTOR.
C.O. FAIRCHILD
BY
ATTORNEYS.

June 25, 1940.    C. O. FAIRCHILD    2,205,777
PHOTOELECTRIC INDICATING CONTROLLER
Filed Feb. 10, 1937    7 Sheets—Sheet 3

INVENTOR.
C. O. FAIRCHILD
BY
ATTORNEYS

June 25, 1940.    C. O. FAIRCHILD    2,205,777
PHOTOELECTRIC INDICATING CONTROLLER
Filed Feb. 10, 1937    7 Sheets-Sheet 4

INVENTOR.
C. O. FAIRCHILD
BY
ATTORNEYS

June 25, 1940.  C. O. FAIRCHILD  2,205,777
PHOTOELECTRIC INDICATING CONTROLLER
Filed Feb. 10, 1937  7 Sheets-Sheet 5

INVENTOR.
C. O. FAIRCHILD
BY
ATTORNEYS

June 25, 1940. C. O. FAIRCHILD 2,205,777
PHOTOELECTRIC INDICATING CONTROLLER
Filed Feb. 10, 1937 7 Sheets-Sheet 6

Fig. 9.

INVENTOR.
C. O. FAIRCHILD
BY
ATTORNEYS

June 25, 1940.   C. O. FAIRCHILD   2,205,777
PHOTOELECTRIC INDICATING CONTROLLER
Filed Feb. 10, 1937   7 Sheets—Sheet 7

INVENTOR.
C. O. FAIRCHILD
BY
ATTORNEYS

Patented June 25, 1940

2,205,777

UNITED STATES PATENT OFFICE 2,205,777

PHOTOELECTRIC INDICATING CONTROLLER

Charles O. Fairchild, St. Albans, N. Y., assignor to Charles J. Tagliabue Mfg. Co., Brooklyn, N. Y., a corporation of New York Application February 10, 1937, Serial No. 125,135

32 Claims. (Cl. 250—41.5)

The present invention relates to instruments and methods of controlling variable magnitudes, and more particularly to instruments of this type which, as disclosed in my copending application Serial No. 56,880, filed December 31, 1935, convert variations in the magnitude to be controlled into deflections of a beam of radiant energy whose presence or direction is detected by a photosensitive element.

It is the general object of the present invention to provide an accurate, simple and compact instrument, of both the "on-off" or 2-position and also of the 3-position types, wherein a photosensitive element and mirror are employed to control a variable whose departures from a predetermined value are converted into variations of a feeble electric current, and wherein part of the beam of radiant energy is utilized to indicate, in association with a suitable dial, the magnitude of the variable, or the condition of the variable with reference to its selected value, the beam thus serving to effect both controlling and indicating.

It is a further object of the invention to provide a controller mechanism which operates without the aid of a motor, and wherein the operative connection between the variable-sensitive mechanism and the correcting or adjusting mechanism is wholly by way of a beam of radiant energy, preferably a beam of visible light.

It is a particular object of the invention to provide a photoelectric controller or similar instrument having a movable mirror galvanometer wherein the possibility of sticking of the mirror to its stops is eliminated; and to provide means for varying the sensitivity of the instrument to make it adaptable for installations having different control requirements.

The instrument of the present invention includes among its essential parts a mirror device which is movable in correspondence with the fluctuations in a sensed variable to be controlled, and in its preferred form is characterized by a potentiometer, Wheatstone bridge or other similar electrical measuring circuit which includes a mirror galvanometer connected to a sensitive element, such as a thermocouple or resistance thermometer, or to any other device which by fluctuations in current or voltage or other electrical magnitude affords an indication or measure of a variable magnitude to be controlled or measured, such as temperature, pressure, flow, level, etc. The instrument includes also a source of light, photosensitive means for detecting the presence or direction of the beam reflected from the galvanometer mirror, means for controlling the measured variable through the operation of said photosensitive means, and, in an indicating controller, means for indicating the momentary value of the variable with reference to its selected value.

In one form of the invention an image of the light source is reflected by the galvanometer mirror and sharply focused on or near the edge of a screen interposed between the mirror and the photoelectric cell or other photosensitive element, the beam traversing an oblique reflector which deflects a portion of the beam upon an indicating window associated with the measuring scale of the instrument; the larger portion of the beam, however, being directed to the photosensitive element for operating the photoelectric circuit. The current generated in the photosensitive element is amplified and made to operate a relay mechanism which is arranged normally to release at a current value almost equal to, that is, slightly less than, the current required to operate it. By such combination of a sharply focused light beam on the controlling edge of the screen or shutter and a relay critically adjusted to operate and release on small changes of current, a high sensitivity is attained, providing a high degree of accuracy of control. A further advantage of this combination flows from the fact that the sensitivity can be adjusted to such a highly enhanced degree that a small amplitude of beam movement and hence a relatively short distance between the galvanometer and controlling edge will be adequate, resulting in compactness of construction. The instrument is characterized further by the feature that it is capable of indicating the momentary value of a variable at all times without interfering with its capacity as a controller, while at the same time the instrument remains of simple construction.

It has heretofore been proposed, i. e. in British Patent 371,177 of 1932, in connection with a method for controlling the vapor content or humidity of a gas, to operate the vapor control mechanism by the change in intensity of a light beam projected in a fixed direction onto a photoelectric cell, a translucent shutter being used for the different purpose (according to the prior proposal) of compensating for the tendency of the photoelectric cell to sometimes react only to comparatively great changes of light. With the translucent shutter, a reduction in the sensitivity of control, i. e. ratio of control change to unit light change, occurs when the relay operates, an operation which differs from that (i. e. shifting at least one edge of a dead zone without alteration of the sensitivity) of the devices later disclosed herein.

The relay mechanism above referred to may also consist of two associated relays which are constructed to open and close contacts in accordance with the output of the amplifier of the photosensitive element, as described more in detail below.

A very desirable feature of the present invention resides in the provision of a scale having an uncolored relatively narrow central zone upon which a portion of the beam is deflected when the apparatus is in balanced condition. Upon each side of the neutral zone is a colored zone, one being, for example, red, and the other green, revealing a red or green band of light when the instrument is out of balance, thereby indicating to attendants even at a distance the condition of the instrument at any moment.

My improved mechanism includes also a vibrator which acts to prevent sticking of the galvanometer against its stops and thereby insures continuously reliable operation of the instrument.

My invention contemplates also the provision of a voltage regulator for insuring constancy of the applied potential and hence reliability of control.

Other objects and advantages of the invention will appear as the description thereof proceeds and the features of novelty will be set forth in the appended claims.

The drawings illustrate by way of example several constructions embodying the principles of the invention. In said drawings.

Figure 6:
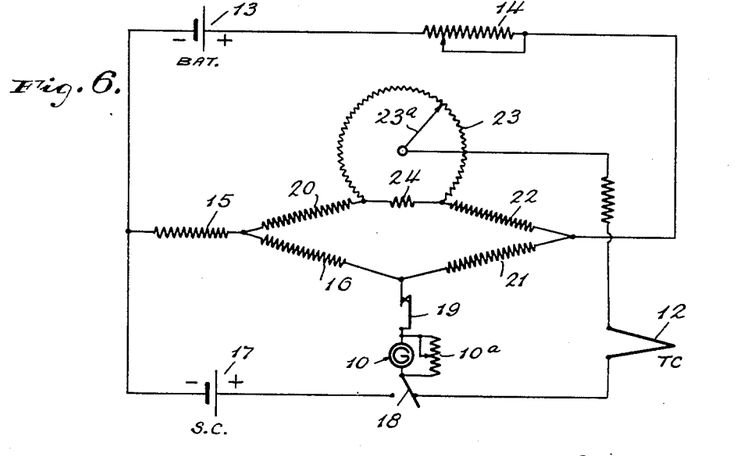
Fig. 6 is a wiring diagram of one form of potentiometer circuit suitable for use with the controller.
Figure 7:
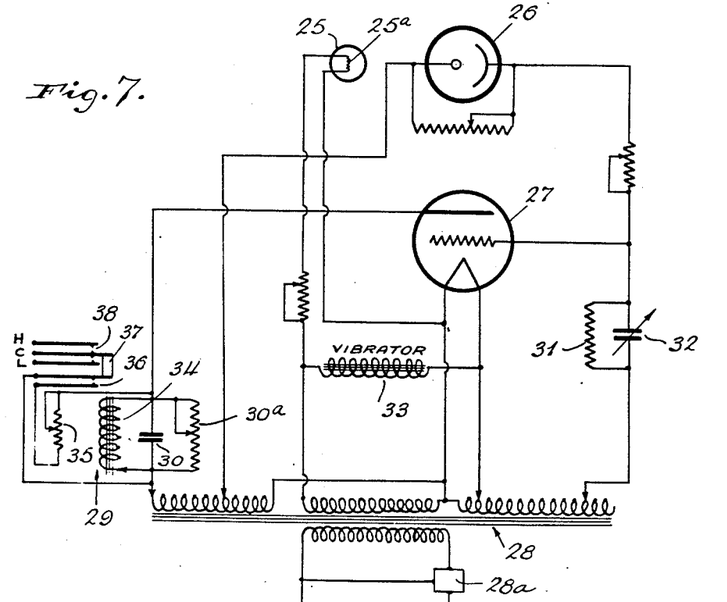
Figs. 7 and 8 show wiring diagrams of two different forms of photoelectric amplifying circuits.
Figure 8:
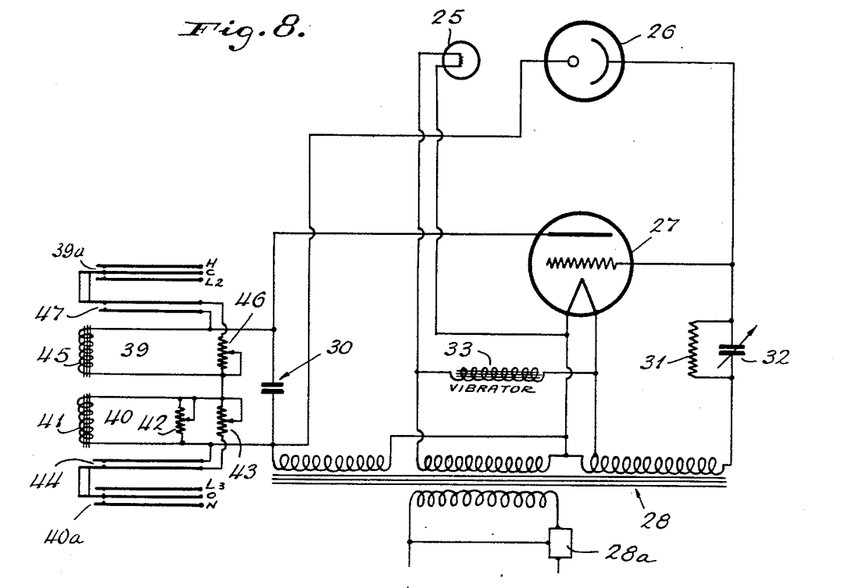

The interrelationship among the various parts of my improved controller will be best understood by referring first to the diagrams on Figs. 6, 7, and 8.

The wiring diagram of Fig. 6 illustrates a potentiometer circuit which includes a galvanometer 10 provided with a mirror 11 (see Fig. 13) as is well understood in the art. In the embodiment of the invention illustrated, the circuit is employed for measuring temperatures with the aid of a thermocouple 12 (TC) and includes a battery 13, the current from which is adjusted with the aid of a rheostat 14 to such a value that the IR drop in resistors 15 and 16 is equal to the E. M. F. of the standard cell 17 (S. C.), the switch 18 being closed on the left during such adjustment so that the galvanometer will be included with the elements 15, 16 and 17. The galvanometer circuit can be opened by way of switch 19 which normally is closed and can be connected with the thermocouple 12 by means of switch 18 which is normally closed against the right terminal, as illustrated. The circuit as a whole consists of a potentiometer modified into the form of a Wheatstone bridge for the purpose of automatically compensating for the reference junction E. M. F. of the thermocouple.

The current through the resistor 15 is divided between the resistors 16 and 20 in one branch and resistors 21 and 22 in the other, with the slide wire 23 between the resistors 20 and 22 and shunted by the resistor 24 for the purpose of calibration. Resistor 16 is made of a wire having a temperature coefficient of resistance suitable for the automatic compensation mentioned above.

The controller forming the subject-matter of the present invention is not limited in its various forms to the use of a measuring circuit with a single scale or a single thermocouple but may embody circuits of various kinds with more than one scale and may be provided with switches for connection to various sensitive elements, such as a number of thermocouples which are connected with the galvanometer in any desired sequence either manually or automatically.

The mirror of the galvanometer 10 reflects a beam of light from a source 25 (Figs. 1, 7, and 8) onto a photoelectric cell 26 whose amplifying circuit is shown in Fig. 7. The cell is connected to the filament circuit of and grid of an amplifying tube 27 in well-known manner, the elements of the tube being connected to terminals on the secondary of the transformer 28, a relay 29 being included in the plate circuit of the amplifier and shunted by a fixed condenser 30. The circuit is self-rectifying and for this purpose a resistor 31, located in the grid circuit, is shunted by an adjustable condenser 32 in order to control the grid voltage. Connected also to terminals on the secondary of the transformer 28 is the lamp 25 which, as already stated, represents the source of light, and the coil of a vibrator 33 whose function will be described below. The relay 29 is shown with its coil 34 shunted by a resistor 35 when the contacts 36 are closed by the attraction of the armature 37 towards the core of the coil 34. The relay carries another set of contacts 38 operated by the armature which are not connected to any other circuit within the controller but are connected by suitable leads to three terminals on the instrument which may be marked respectively H, C and L. These terminals are connected to external circuits which operate suitable devices for increasing or decreasing the temperature, as required, at the place where the thermocouple TC is located.

In the operation of a controller embodying the circuit of Fig. 7, such controller being of the 2-position or "on-off" type, the beam reflected by the galvanometer mirror, in the balanced condition of the measuring circuit shown in Fig. 6, is directed upon an edge defining a terminal contact of the beam with the photo-responsive element 26, the beam falling partly upon the sensitive area and partly outside it. With such arrangement a high degree of sensitivity is achieved, for movement of the beam in either direction to only a slight extent will vary considerably the current passing through the relay and effect opening and closing thereof within extremely small ranges of temperature (or other) variations.

Figure 10:
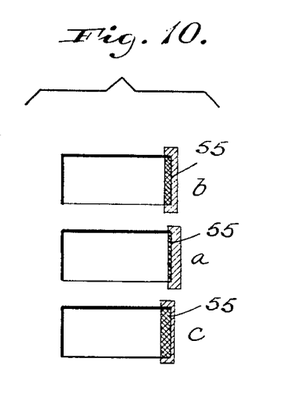
Fig. 10 shows diagrammatically a simple controlling edge or screen and illustrates three positions of the light image with reference to the controlling edge.

The action of the shunting resistor 35, which may be adjustable, is as follows: When the current in the plate circuit reaches a value required to operate, that is, close the relay, contacts 36 close, thereby lowering the current through the coil 34 because the plate resistance is considerable, for it should be noted that the impedance of the internal plate circuit should be comparable with the external impedance in order to obtain a satisfactory efficiency. The value of the resistor 35 is normally so selected that when the relay closes, the current through its coil will be reduced to a value only slightly larger than the minimum required to keep it closed. Thus, when the reflected light image varies in position with reference to the controlling edge 24 as shown in Fig. 10, a very slight movement will suffice to operate and release the relay 29. The resistor 35 may in fact be adjusted to such a value that when the relay operates, the current through its coil 34 is reduced to a value equal to or slightly less than that required to keep it closed, in which case the relay will continue to oscillate while the reflected light beam remains, for example, in the intermediate position b, and will oscillate with a variation in the percentage of time it is closed and opened as the light image moves in a manner to increase or decrease the amount of light falling on the photocell. For industrial purposes it is only necessary to select a value for the resistor 35 which will be just large enough not to cause relay 29 to oscillate, in order to provide a controller with very great sensitivity and without the use of a galvanometer of particularly high sensitivity and correspondingly delicate parts.

It is desirable to avoid fluttering of the relay with its resulting wear, and to this end the condenser 30 operates to delay the action of the relay, its effect being to increase the time interval between the opening and closing of the relay.

The sensitivity of the instrument may be regulated further by way of the amplifying or relay circuit by arranging a variable resistor 30a in parallel with the relay or equivalent mechanism, the adjustment of the resistor determining the degree of deflection of the light beam required to operate the relay mechanism.

A voltage regulator of any suitable construction is provided, as shown conventionally at 28a, to keep constant the E. M. F. applied to the instrument.

The type of controller represented by the circuit shown in Fig. 7 is commonly called "on-off" or "2-position" because there are only two arrangements of the contacts H, C and L, namely C—H closed or C—L closed, there being no intermediate third position in which C is not connected to either H or L.

The sensitivity of the controller may be reduced in various ways without changing the value of the resistor 35; for example, by increasing the resistance in the circuit of the galvanometer 10, by increasing the size of the light image and thus necessitating a greater angular movement of the galvanometer mirror for a given percentage change in light on the photosensitive element, or by distorting or modifying the controlling edge as will be described more fully hereinbelow in connection with Figs. 11 and 12.

The use of the circuit of Fig. 7 is not limited to the inclusion of a relay of the type shown but may include any electromagnetic or electronic device which serves to make available contacts for carrying more than the plate current of tube 27, or amplifies this current, as with a gaseous triode. The latter can, of course, be substituted directly for the vacuum tube 27 where the use of the instrument calls for the direct application of the controller's output. It will be apparent that in the latter instance the controller will have no terminal H but only C and L for the controlling connections.

For some purposes, however, the three terminals H, C and L are inadequate to bring about the desired mode of control. In such cases a modified form of circuit as illustrated in Fig. 8 can be used, such circuit being of the so-called "3-position" type. The primary purposes of the so-called "3-position" control are (1) to maintain one resident position as long as the controlled variable remains between selected limits, the controlling or governing action being then intermediate those at the limits, and (2) to save wear on the control equipment by holding the middle or neutral position as much of the time as possible instead of causing the mechanism to oscillate constantly back and forth between two positions.

In the amplifier circuit shown in Fig. 8, two relays 39 and 40 are included in the plate circuit of the amplifier tube 27, shunted as in Fig. 7, by a fixed condenser 30. The coil 41 of relay 40 is permanently shunted by the adjustable resistor 42 and is shunted, while the relay is closed, also by the adjustable resistor 43, under the control of the contacts 44. The coil 45 of the relay 39 is shunted by the adjustable resistor 46 by way of the contacts 47 when the relay 39 is closed. The purpose of this arrangement is to cause the relay 40 to close at a higher value of the plate current than the relay 39; as a result, there will be a zone of positions of the light image with reference to the controlling edge that the relay 39 will be closed and relay 40 open so that a deflection of the galvanometer to either side of such zone will result in both relays being open or both being closed. It will be obvious that the values of the resistors 42, 43 and 46 can be so selected that with two identical relays the operating and releasing currents can be nearly the same for each relay separately, with the operating current of relay 40 as near to that of relay 39 as desirable.

The arrangement of the parts of the instrument on the casing 48 and door 49 is shown in Figs. 1–5. The lamp 25, with the vertical filament 25a, is mounted in its housing 50 fastened to the casing. The housing supports also the adjustable telescope 51 with its two condenser lenses 52 (see Fig. 1), the telescope having a restricted limiting circular opening 53 (see Fig. 5). The lamp is supported near the photosensitive element 26, and the projector tube 51 is directed at a slight inclination to the horizontal and toward the mirror 11 which reflects the light beam at the same angle with the horizontal toward the photocell 26 whose casing or cover 26a is provided with an opening 54 (Fig. 5) having a vertical controlling edge 55 in approximately the same vertical plane with the lamp and galvanometer mirror. The photocell and amplifying tube 27 are supported by the bracket 56 which extends across the case so as to support a partial reflector 75

Figure 1:
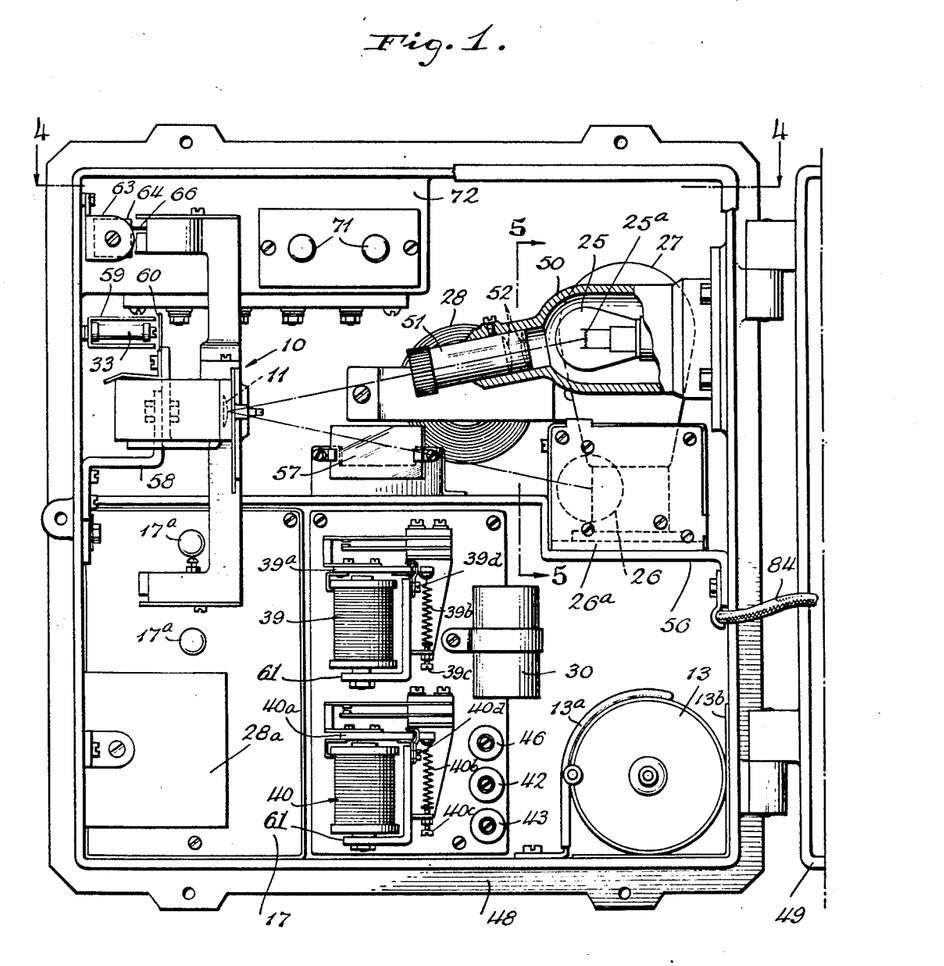
Fig. 1 is a front view of the controller instrument showing a typical arrangement of parts, the door of the casing being open.

57 whose function will be described more fully below. The reflector, as shown best in Fig. 1, is a transparent plate, such as a piece of plate glass having parallel plane surfaces and arranged in the path of the beam reflected by the galvanometer mirror toward the photo-sensitive element. The galvanometer 10 is shown supported on its own bracket 58.

The vibrator 33 is supported on the casing and includes an iron yoke 59 and an armature 60 which is attached to the upper extremity of the bracket 58. The battery 13 is fixed in the lower right-hand corner with an insulated clamp 13a against insulating sheets 13b positioned between it and the case to avoid accidental grounds.

The relays 39 and 40, with their associated parts, the condenser 30, and resistors 46, 42 and 43 are mounted on a plate 61 supported on the back of the casing 48. In a 2-position controller, one of the relays and one or two of the resistors will be omitted.

The transformer 28 is fastened to the back of the case conveniently for wiring to the photo-electric circuit, and the standard cell 17 is concealed behind a cover having the cell terminals 17a.

Figures 13, 14:
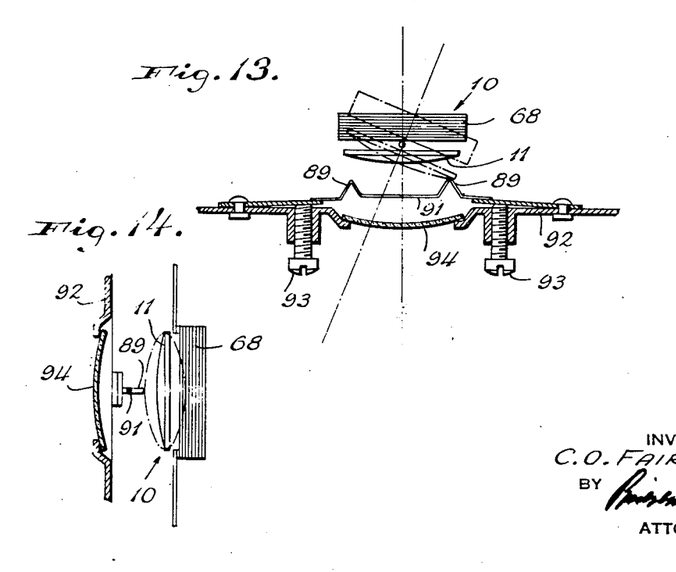
Fig. 13 shows in plan the stops for the galvanometer mirror, adjacent parts being in section.
Fig. 14 is a vertical side view of the galvanometer mirror.

A zero adjuster for the galvanometer is provided and can be operated, with the door 49 closed, by turning the screw 62 which is supported in a bracket 63. A tapped insulator block 64 receives the screw and is held against rotation thereon. The block is provided with a slot 65 which engages the arm 66 carrying the galvanometer suspension 67 by means of which the galvanometer coil 68 is rotated (Figs. 13 and 14). The hole in the door necessary to permit operation of the screw 62 from without is gasketed by the rubber ring 69 on sleeve 70, the ring being compressed when the door is closed.

Terminals 71 for the galvanometer are mounted on the inner wall of the housing or compartment 72 holding the terminal board 73 (Fig. 4) with terminals 74. The compartment 72 is normally covered by a gasketed plate which is screwed onto the same.

Figure 2:
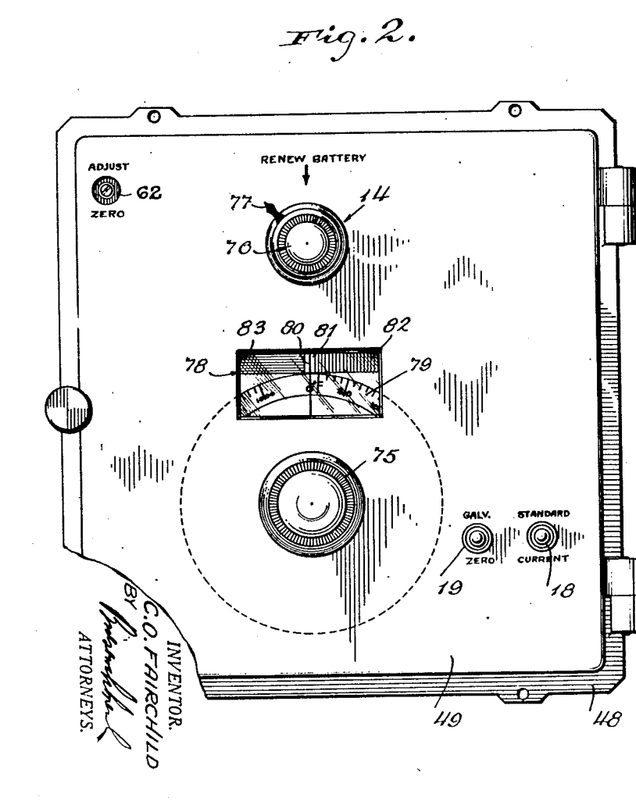
Fig. 2 shows a front view of the controller with the door of the casing closed.
Figure 3:
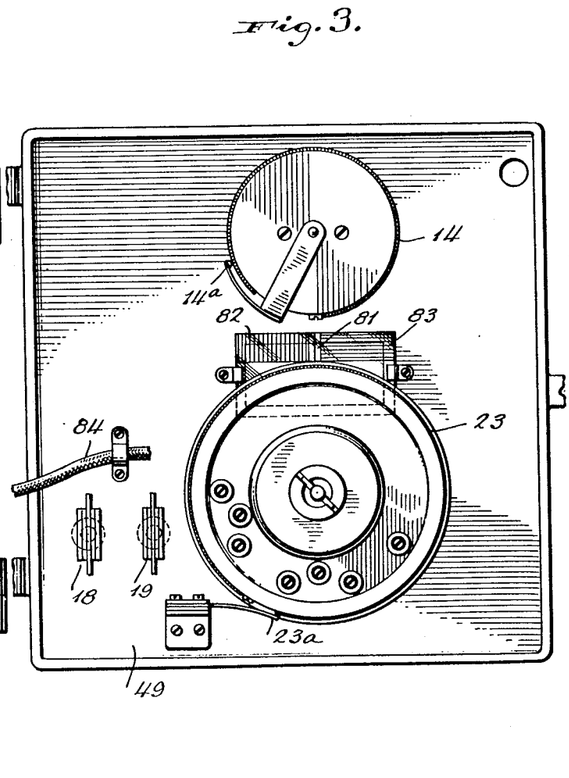
Fig. 3 shows a rear view of the opened door.
Figure 4:
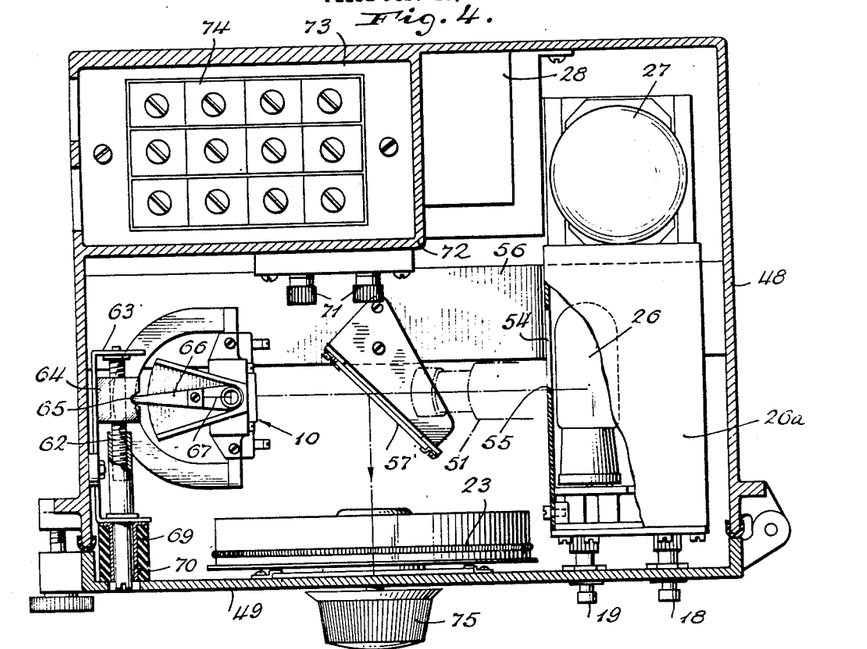
Fig. 4 represents a plan view of the instrument with parts in section.
Figure 5:
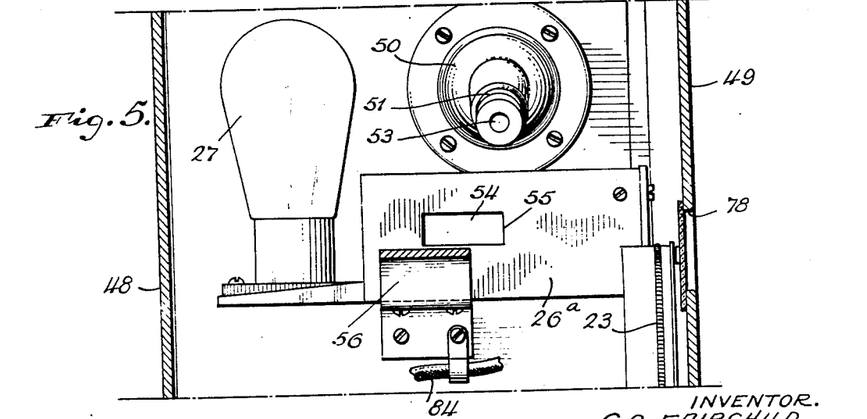
Fig. 5 is a side view looking from the left at the controlling edge and light projector and is a section along the line 5—5 of Fig. 1.

The front of the closed door in Fig. 2 presents the slide wire knob 75, the zero adjusting screw 62, the rheostat knob 76 with an indicating index 77, the two switches 18 and 19, and a translucent or transparent window 78. A part of the circular scale 79 is shown.

The reflector plate 57 is positioned in the path of the beam reflected from the galvanometer mirror in order to direct a portion of the swinging light beam upon a window 78 located above and adjacent to the scale 79, the larger part of the light, however, being transmitted to the photocell. The window is provided with a central uncolored zone 81 having an index line 80, and to the right and left of the uncolored zone are differently colored zones 82 and 83. When the instrument is in balance, that is, when the predetermined value of the variable is being maintained, the reflected image of the filament of lamp 25 will be thrown on uncolored zone 81 of the window, which then becomes illuminated and makes known to an attendant, who may be at a distance from the instrument, that the instrument is functioning properly. On the other hand, if the streak of light is in either of the colored zones 82 and 83, the instrument is out of balance and has not yet restored the predetermined value of the variable. If the light appears in zone 82 or 83, for any length of time, it is a notice to the attendant that something has gone wrong with the power supply, the external circuits or a part of the instrument. The zone 82 may be colored red to indicate, for example, that the temperature has increased, and the zone 83 may be blue or green to indicate that the temperature has fallen; or any other combination of colors may be employed to reveal at a glance, and from a distance, the condition of the controlled variable or of the instrument.

The two surfaces of the reflector plate 57 will reflect two spaced images upon the window. I prefer to employ a plate of such thickness that a double line image is obtained which is divided by a fine dark line, with the aid of which the position of the image may be read off on a scale associated with the window.

The reflector 57 is positioned with its plane at 45° to the plane of the window and to the plane of the incident beam and axis of rotation of the galvanometer mirror, but it may be positioned also in other ways depending upon the relative location of the associated parts of the instrument.

The rheostat 14 with contact 14a and slide wire 23 with contact 23a are shown mounted on the rear of the door. On the slide wire disc are mounted the resistors of the measuring circuit, which is connected to the galvanometer, battery, and instrument terminals through the flexible cable 84, shown only fragmentarily.

In the use of a "3-position" controller, it is sometimes desirable to adjust the so-called neutral zone to regulate the sensitivity of the instrument. This can be accomplished in my improved instrument by means of the adjustable screen 85 shown in Fig. 11. The screen is provided with a slot 86 which is narrower, in the vertical direction, than the opening 54 in the housing of the photosensitive element 26. When the light image is in the position a, both relays 39 and 40 are open. A slight movement of the light image to the left will increase the amount of light falling on the photosensitive element sufficiently to cause closing of relay 39, which will remain closed for all positions of the image farther to the left, as at b. At position c, most of the light of the reflected beam passes the screen and reaches the photocell, thus causing closing of the relay 40. From the position c a slight movement to the right opens the relay 40, while leaving relay 39 closed, the latter opening only when the image moves back nearly to the position a. It follows that there are three positions of the two relays, namely a both relays open; b one closed and the second open; and c both closed.

The positions a and c can be read with sufficient accuracy on the scale of the instrument, or one position, for example a, can be read with a high degree of accuracy by making this position correspond to the open circuit or zero position of the galvanometer, this position of the galvanometer corresponding to the balanced condition of the potentiometer or Wheatstone bridge.

Figure 11:
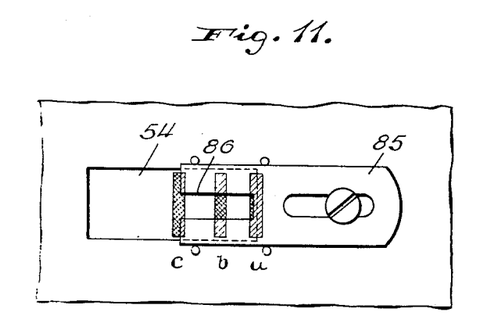
Fig. 11 illustrates an adjustable controlling edge and also shows various positions of the light image.
Figures 12, 15:
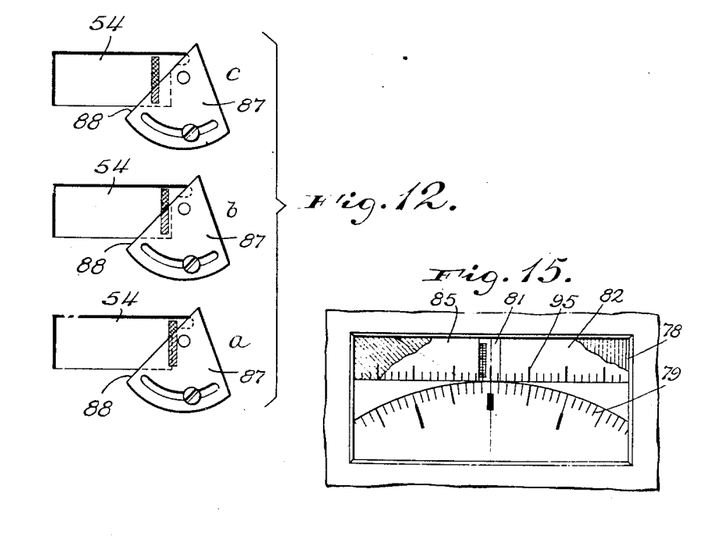
Fig. 12 shows a further form of adjustable controlling edge.
Fig. 15 shows a modified form of window.

Another form of screen presenting a controlling edge is shown in Fig. 12 in which an adjustable sector 87 is so set that the controlling edge 88 is not parallel with the sides of the rectangular light image, and in which the two positions a and c of the reflected image correspond approximately to those similarly designated in Fig. 11. The sector 87 can be placed with the edge more nearly horizontal than is illustrated, or it may be just vertical where it coincides with the edge of the opening 54. The sector does not provide as precise a selection of position limits as does the screen 85 of Fig. 11, and is useful mainly near the vertical position where the three positions of control are brought close together. If these three positions must be very close, as when the permissible variation of the controlled variable is relatively small, the simple opening 54 with the vertical edge, as shown in Fig. 10, may be employed, in which case a very small movement of the reflected image will operate relays 39 and 40 in succession and cover all three positions.

There are shown on the two relays 39 and 40 two sets of contacts 39a and 40a, respectively, not connected with the rest of the circuit but intended for connection to terminals on the instrument and marked H, C, L2, L3, O and N. These six terminals provide for various combinations of connections to external devices for so-called "3-position" control.

Figure 9:
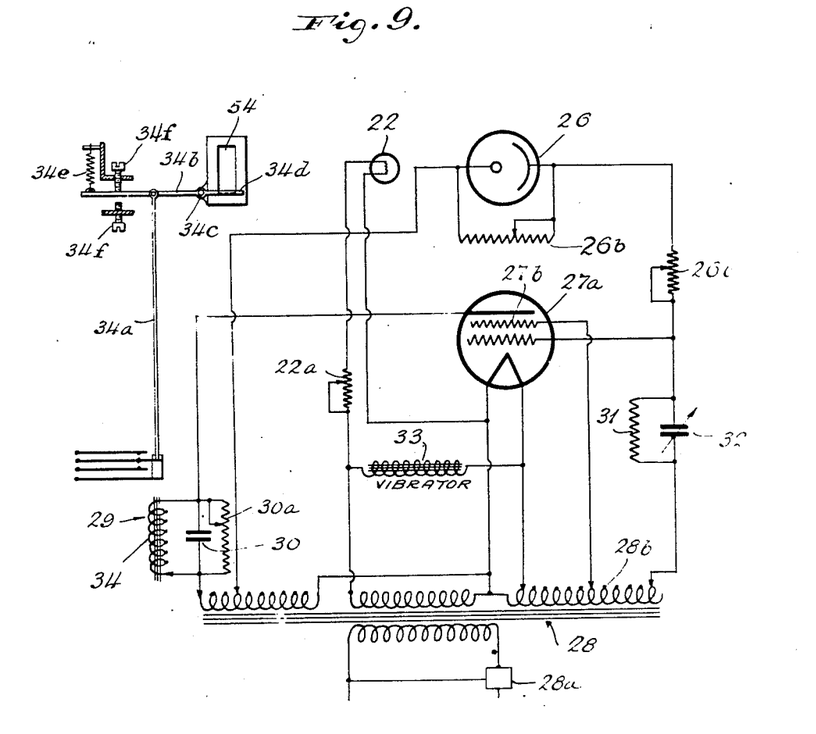
Fig. 9 shows a modified circuit with mechanism controlled by said circuit to reduce the beam movement required for effecting opening and closing of the relay mechanism.

In the modified form of circuit shown in Fig. 9, wherein parts corresponding to those shown in Fig. 7 have similar reference characters, the sensitivity of the circuit is made adjustable by connecting the screen grid 27b of a screen grid amplifying tube 27a to a variable secondary coil 28b of the transformer 28. The sensitivity can be further adjusted by means of either of variable resistors 26b in the circuit of the photosensitive element 26; and by a variable resistor 22a in the circuit of the source of light 22. These methods of sensitivity control can, of course, be employed also in 3-position circuits.

Fig. 9 shows also a mechanical device for increasing the sensitivity of the controller by reducing the deflection of the beam required to effect operation of the relay. The mechanism consists of a rod or link 34a attached to the armature of the relay 29 and connected to an intermediate portion of a lever 34b pivoted at 34c to the screen or housing of the photocell. An extension 34d of the lever is arranged to overlap the opening 54 in the manner of a shutter in the path of the reflected light beam. The lever 34b is urged toward the open position by a spring 34e and moves between adjustable stops 34f.

When the light beam illuminates the photocell and the relay 29 is closed, the lever extension 34d is in the closed position. Assuming that the relay requires a fall in current to 1 m. a. to cause opening thereof, the extension 34d, on closing of the relay (which requires, for example, 5 m. a.) cuts down the light so that the current through the relay is about 1.5 m. a. A slight movement of the beam in the direction of the extension will thus bring the current to 1 m. a. or below and cause opening of the relay. When this happens, the extension exposes the opening 54 to such a degree that the current through the relay is about 4 m. a. A slight deflection of the beam (this time away from the extension) will now raise the current to 5 m. a. and cause the relay to close. It will thus be seen that by proper adjustment of the movement of lever 34b, the relay will be opened and closed on minute movements of the light beam. In fact the amplitude of the beam between its relay-opening and closing positions can be reduced to such an extent that the relay will chatter while the beam stays practically fixed.

The galvanometer mirror is provided with stops 89 (Figs. 13 and 14) which limits its swing in both directions. These stops are adjustable by means of the screws 93, and are shaped to present only a small area of contact with the front surface of the mirror, so that the forces of adhesion and of surface tension of deposited films on the mirror and the tips of the stops will be small. Galvanometers of low torque, however, tend to stick to their stops, and for this reason, in the form of the invention illustrated, there is provided the vibrator 33 shown in Figs. 1, 7 and 8, referred to above, which acts to shake the galvanometer coil loose from the stops and overcomes any tendency toward sticking against the stops. The intensity and frequency of vibration are selected so as not to affect noticeably the coil 68 when it is not fully deflected. The frequency of the vibrator should be different from the natural frequency of the galvanometer, and this may be insured by suitably adjusting the galvanometer suspension. The vibrations are communicated to the stops by the armature 60 attached to the galvanometer.

The stops 89 as shown in Fig. 13 may comprise bent-out portions of a sheet metal plate or wire 91 whose ends are fixed to the face plate 92. They may be adjusted by means of screws 93 mounted in such face which also carries the glass window 94 which acts to protect the mirror against drafts.

The galvanometer stops are preferably arranged in the plane of percussion of the mirror and coil, the mirror and coil being mounted symmetrically with respect to said plane. The stops are so arranged that at one limit of movement, the reflected beam illuminates the photocell, while at the other limit it passes beyond the controlling edge and off the cell.

The filament 25a of the lamp 25 is preferably of the straight wire, or helical, type so as to give a sharply defined, narrow image. If desired, the sensitivity may be regulated, by adjusting the angularity of the filament by rotating the lamp instead of adjusting the controlling edge in front of the photosensitive element. The change in the angular position of the filament has the advantage that the zero point is not changed, whereas adjustment of the controlling edge requires re-setting of the zero point. The light beam can also be given the shape of a T lying on its side, in which case the adjustable screens shown in Figs. 11 and 12 can be dispensed with.

In the form of window 78 shown in Fig. 2, the degree of deflection of the light beam from the normal position can be read off approximately from the adjacent scale 79. Where, however, it is desired to read off the deflection accurately in terms of degrees or otherwise, the window 78 may be provided as in Fig. 15 with its own scale 95 calibrated to indicate the values of the deflections in the desired units.

While the terminology used in the claims is largely to be found in the above description, still the following definition will be found to apply to some of the claims: As used herein, a servo-operated controller comprises an indicating means, the position of which is sensitive to and corresponds with the value of the variable to be controlled, means for regulating this variable or another affecting it, and governing means, including relay means and having a dead zone, for governing the operation of the regulating means in accordance with the responsive position of the indicating means to control the indicated variable in a predetermined manner.

Various parts of my improved mechanism can be used without other parts disclosed herein and variations may be resorted to within the scope of the appended claims without departing from the spirit of the invention.

I claim:

1. In a controller for a variable, the combination of a light source, focusing means for defining a stationary light beam shining therefrom, means moving in correspondence with said variable and including a mirror arranged in the path of said stationary light beam, a photoresponsive element arranged to be illuminated by a light beam reflected from said mirror and having the edge of said element contacting said reflected beam at predetermined values of said variable and having an electric output current dependent upon the position of said reflected beam relative to said edge, and relay mechanism responsive to said electric current for governing said variable, said mirror being provided with a mirror stop device to limit the movement thereof and means operatively associated with said stop device for overcoming any tendency of the mirror to stick to said stop device, said last named means being adapted and arranged to be substantially without effect on the position of said mirror when the latter is away from said stop device.

2. A controller as set forth in claim 1, including means for causing the relay mechanism to open and close at substantially the same beam position.

3. In a controller for a variable quantity, the combination of a light source, means moving in correspondence with said variable quantity and including a mirror arranged in the path of a light beam from said source, a photoresponsive element arranged to be illuminated by the beam reflected by said mirror, a plurality of relay devices controlled by said photoresponsive element for governing the variable quantity and operable at different positions of the reflected light beam with reference to said element, and means for varying the different relay-operating positions of the light beam.

4. In a controller for a variable quantity, the combination of a light source, means moving in correspondence with said variable quantity and including a mirror arranged in the path of a light beam from said source, a photoresponsive element arranged to be illuminated by the beam reflected by said mirror, a plurality of relay devices controlled by the photoresponsive element for governing the variable quantity and operable at different positions of the reflected light beam with reference to said element, one of said relays being closed and the other open while the beam is in a neutral zone corresponding to a condition of balance and in which it partially illuminates the element, both relays being respectively open or closed when the beam passes one or the other limit of the neutral zone, and means for effecting variation of the extent of the neutral zone.

5. In a controller for a variable quantity, the combination of a light source, means moving in correspondence with said variable quantity and including a mirror arranged in the path of a light beam from said source, a photoresponsive element arranged to be illuminated by the beam reflected by said mirror, and a plurality of relay devices controlled by said photoresponsive element and selectively responsive to a plurality of light beam positions relative to said element.

6. A controller for a variable comprising a light source, mechanism movable in accordance with fluctuations in the variable and including a mirror in the path of the beam emitted by the light source, a photoresponsive element arranged to be illuminated by the reflected beam of light, relay mechanism controlled by the photoresponsive element for governing the variable, said element having a sharply defined edge representing a lateral boundary of the sensitive zone, and means for focusing the beam to cause a relatively narrow band of light to fall upon said edge in the neutral or balanced position of the beam, the beam partially illuminating the element in such position.

7. A controller as set forth in claim 6, including means for regulating the sensitivity of the photoresponsive element.

8. A controller as set forth in claim 6, including means for regulating the change of illumination of the photoresponsive element for a unit deflection of the light beam.

9. A controller for a variable comprising a light source, mechanism movable in accordance with fluctuations in the variable and including a mirror in the path of the beam emitted by the light source, a photoresponsive element arranged to be illuminated by the reflected beam of light, relay mechanism controlled by the element for governing the variable, and a screen overlapping the element and presenting an edge defining a terminal contact of the beam and element, said screen being adjustable to vary the angularity of said edge.

10. A controller for a variable comprising a light source, mechanism movable in accordance with fluctuations in the variable and including a mirror in the path of the beam emitted by the light source, a photoresponsive element arranged to be illuminated by the reflected beam of light, relay mechanism controlled by the element for governing the variable, and a screen having a discontinuous edge overlapping the element and defining three angularly spaced beam zones in two of which the said element is illuminatable to different degrees by the beam.

11. In a photoelectric instrument, the combination with a source of light, a mirror in the path of the beam emitted by said source for deflecting its reflected beam, a photosensitive element arranged to be illuminated by the reflected beam, and a casing for housing the instrument, of a transparent window in said casing visible from outside the casing, and a reflector arranged to deflect upon said window a part of the reflected and deflected light beam, said window having differently colored areas which, when illuminated by the reflected beam, indicate the direction of deflection of the light beam from a normal position.

12. In a controller for a variable quantity, the combination of a measuring circuit including a mirror galvanometer, a light source arranged to direct a beam upon the mirror of the galvanometer, a photoresponsive element arranged to be illuminated by the beam reflected by said mirror, and mechanism controlled by the photoresponsive element for governing said variable quantity and including an amplifying circuit, and means for varying the amplification factor of said circuit to regulate the sensitivity of the controller.

13. In a controller for a variable quantity, the combination of a measuring circuit including a mirror galvanometer, a light source arranged to direct a beam upon the mirror of the galvanometer, a photoresponsive element arranged to be illuminated by the beam reflected by said mirror, and mechanism controlled by the photoresponsive element for governing said variable quantity and including an amplifying circuit containing a screen grid tube and the secondary of a transformer, and a variable connection between at least one of the grids and the secondary.

14. A controller as set forth in claim 6, including a power circuit for said photoresponsive element and a voltage regulator associated with said power circuit.

15. A controller as set forth in claim 1, wherein the means for overcoming any tendency of the mirror to stick to said stop device includes an electromagnetic vibrator.

16. In a controller for a variable, in which the deflection of a light beam relative to a photocell edge governs the controlling action, means adapted and arranged to deflect the light beam relative to the photocell edge in correspondence with the variable, and means controlled by the photocell for altering the quantity of light received by the photocell.

17. In a controller for a variable, in which the deflection of a light beam relative to a photocell edge governs the controlling action, means adapted and arranged to deflect the light beam relative to the photocell edge in correspondence with the variable, and means controlled by the photocell for altering the quantity of light received by the photocell according to the direction of the deflection.

18. In a controller for a variable, in which the deflection of a light beam relative to a photocell edge governs the controlling action, means adapted and arranged to deflect the light beam relative to the photocell edge in correspondence with the variable, and means controlled by the photocell and adapted and arranged to reduce the light quantity when above a normal value and vice versa.

19. In a controller for a variable, in which the deflection of a light beam relative to a photocell edge governs the controlling action, means adapted and arranged to deflect the light beam relative to the photocell edge in correspondence with the variable, and means controlled by the photocell for altering the quantity of light received by the photocell, said last named means being adapted and arranged to effect the alteration of light quantity when the light beam is deflected onto the photocell and past a normal position adjacent said edge thereof.

20. In a controller for a variable, in which the deflection of a light beam relative to a photocell edge governs the controlling action, means adapted and arranged to deflect the light beam relative to the photocell edge in correspondence with the variable, and means controlled by the photocell for altering the quantity of light received by the photocell, said last named means including trigger-action means and being adapted and arranged to suddenly act to effect the light quantity alteration.

21. In a servooperated controller, set to maintain a predetermined value of a variable, an element positionable in correspondence with the variable to correspondingly affect a light beam from it, a light responsive relay means actuatable by a beam from said element and having a dead zone, and means governed by said relay means when said element is outside said dead zone by a definite total distance to alter the position of said dead zone in the direction of said element relative to the position of said dead zone before said element departed from said dead zone.

22. In a device responsive to a variable, governing means including a light-responsive relay means and having a dead zone, means positionable in correspondence with the variable while adjacent and within the dead zone and effective to alter the light to said relay means, and means actuated by said relay means and operatively connected to the positionable means to alter the level of response of the device in accordance with the position of the positionable means relative to the dead zone while maintaining the sensitivity of controlling substantially constant.

23. In a device responsive to a variable, governing means including a light-responsive relay means and having a dead zone, means positionable in correspondence with the variable while within the dead zone to accordingly alter the light to said relay means, and means actuated by said relay means and operatively connected with the positionable means to alter the level of response of the device by a definite total amount upon the departure of the positionable means from the dead zone without affecting the sensitivity of governing and to maintain such alteration substantially for the duration of such departure.

24. A servooperated indicating controller comprising an instrument including positionable means responsive to a variable; means for regulating this variable or another affecting it; and governing means, including relay means, for operating the regulating means in accordance with the response of the variable responsive means to control the indicated variable in a predetermined manner; said positionable means including a light source, focusing means, a galvanometer including a mirror arranged in the path of a focused light beam, a photocell arranged to be illuminated by a light beam reflected from said mirror and having an angularly adjustable edge, stop means disposed to abut said mirror at its limits of movement and anti-stick means comprising an electromagnetic vibrator and operatively associated with said stop means; said focusing means being adapted to sharply focus the light image on said photocell edge as a narrow line parallel therewith; said instrument including a transparent window therein visible from the outside and a transparent plate in the path of the reflected beam arranged to reflect upon said window a part of such beam, the surfaces of the transparent plate being parallel plane surfaces, the window being provided with two differently colored terminal areas; a measuring scale being adjacent said window index line; said relay means including a coil, an armature, and contacts; and an adjustable rheostat being associated with said coil and one set of said contacts to cause the relay means to open and close at substantially the same value of the output current from said photocell; said governing means including an amplifying circuit connecting said photocell and relay means; said amplifying circuit including an amplifying tube, the secondary of a transformer, and a variable connection therefrom to the control grid of said tube.

25. A controller for a variable comprising, in combination, a photoresponsive element having a current output corresponding with the quantity of light which illuminates the element, means for deflecting a light beam relative to an edge of said element in correspondence with the value of the variable, relay means operable in accordance with the current from said element for controlling the value of the variable, and means governed by said relay means for altering the relay-operating deflections of the light beam.

26. A controller as set forth in claim 25, wherein the light beam in its normal position partially illuminates the photoresponsive element.

27. A controller as set forth in claim 25, wherein the last named means includes a movable shield having an edge which is effective as the said edge of the element and which shield edge is positionable by said relay means.

28. In a servooperated controller for a variable quantity, the combination of means sensitive to and positionable in correspondence with the value of the quantity and means coacting therewith for setting a predetermined controlling value, relay means for establishing a dead zone about the set value for the sensed value and regulating the quantity and operable by the first named means in accordance with the sensed value when such value is outside said dead zone, and means operative by said relay means to shift at least one edge of the dead zone a definite total amount, upon a departure of the sensed value from the dead zone, in the direction of such departure.

29. The combination set forth in claim 28 in which the last named means is constructed and arranged relative to said relay means to be operable by the latter for the duration of such departure to shift a dead zone edge as stated for substantially such duration and to maintain the sensitivity of controlling substantially constant.

30. The method of governing the regulator of a servooperated controller set to maintain a predetermined value of a sensed variable relative to a dead zone which is associated with said value which comprises the steps of positioning in correspondence with the sensed value of the variable an element relative to a corresponding dead zone, modifying in accordance with such position the value of a physical condition which governs the operation of the regulator, and shifting at least one edge of the dead zone a definite total amount in the direction of the departure of such position from the dead zone in dependence upon the value of the governing condition while maintaining the sensitivity of controlling substantially constant.

31. The method of governing the regulator of a servooperated controller as set forth in claim 30, in which the shifted position is maintained for substantially the duration of such departure.

32. In a servooperated controller for a variable, the combination of a photoelectric element having a current output which depends upon its illumination, means sensitive to the variable for correspondingly positioning a light beam relative to the element, an electrical relay means connected with said element and actuated by the current output therefrom to govern the return of the variable to a predetermined value, and means actuated by said relay means to alter a relay-operating position of the light beam when the relay means is operated—to reduce the difference between the values of the variable at which the relay is operatively energized and de-energized.

CHARLES O. FAIRCHILD.

CERTIFICATE OF CORRECTION.

Patent No. 2,205,777.   June 25, 1940.

CHARLES O. FAIRCHILD.

It is hereby certified that error appears in the printed specification of the above numbered patent requiring correction as follows: Page 1, first column, line 1, after the word "instruments" insert --for--; page 2, second column, line 40, for "filament" read --plate--; line 50, for "is" read --are--; page 5, first column, line 70, for "limits" read --limit--; page 7, first column, lines 69 and 70, claim 21, strike out "by a definite total distance" and insert the same after the word "zone" in line 71, same claim; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.

CERTIFICATE OF CORRECTION.

Patent No. 2,205,777. June 25, 1940.

CHARLES O. FAIRCHILD.

It is hereby certified that error appears in the printed specification of the above numbered patent requiring correction as follows: Page 1, first column, line 1, after the word "instruments" insert --for--; page 2, second column, line 40, for "filament" read --plate--; line 50, for "is" read --are--; page 5, first column, line 70, for "limits" read --limit--; page 7, first column, lines 69 and 70, claim 21, strike out "by a definite total distance" and insert the same after the word "zone" in line 71, same claim; and that the said Letters Patent should be read with this correction therein that the same may conform to the record of the case in the Patent Office.

Signed and sealed this 6th day of August, A. D. 1940.

Henry Van Arsdale,
Acting Commissioner of Patents.

(Seal)